US012416403B2

(12) United States Patent
Huang

(10) Patent No.: US 12,416,403 B2
(45) Date of Patent: Sep. 16, 2025

(54) LIGHT-EMITTING MIRROR AND FLUORESCENT MESSAGE MIRROR

(71) Applicant: Huidong Huang, Guangzhou (CN)

(72) Inventor: Huidong Huang, Guangzhou (CN)

( * ) Notice: Subject to any disclaimer, the term of this patent is extended or adjusted under 35 U.S.C. 154(b) by 0 days.

(21) Appl. No.: 18/927,302

(22) Filed: Oct. 25, 2024

(65) Prior Publication Data

US 2025/0224108 A1 Jul. 10, 2025

(30) Foreign Application Priority Data

Jan. 8, 2024 (CN) .......................... 202420046802.5

(51) Int. Cl.
*F21V 33/00* (2006.01)
*A45D 42/10* (2006.01)
*A47G 1/04* (2006.01)
*F21V 8/00* (2006.01)

(52) U.S. Cl.
CPC ............ *F21V 33/004* (2013.01); *A45D 42/10* (2013.01); *A47G 1/04* (2013.01); *G02B 6/004* (2013.01); *G02B 6/0055* (2013.01); *G02B 6/0088* (2013.01); *G02B 6/009* (2013.01); *A47G 2200/08* (2013.01)

(58) Field of Classification Search
CPC ...... A45D 42/10; A47G 1/04; A47G 2200/08; F21V 33/04; G02B 6/004; G02B 6/005; G02B 6/008; G02B 6/009
USPC .................................................. 362/135, 140
See application file for complete search history.

(56) References Cited

U.S. PATENT DOCUMENTS

| 7,090,378 | B1 | 8/2006 | Zadro |
| 11,622,614 | B2 | 4/2023 | Yang et al. |
| 2016/0341415 | A1* | 11/2016 | Lumaye .................. A47G 1/02 |
| 2023/0280004 | A1 | 9/2023 | Donohue |
| 2024/0167675 | A1 | 5/2024 | Yang et al. |

FOREIGN PATENT DOCUMENTS

CN 114680541 A * 7/2022 ............ F21V 33/004

* cited by examiner

Primary Examiner — Keith G. Delahoussaye
(74) Attorney, Agent, or Firm — George D. Morgan

(57) ABSTRACT

A light-emitting mirror includes a light-transmitting plate, a frame and a light source module. The light-transmitting plate has a front side, a back side and a sidewall, the sidewall connects the front side and the back. The light-transmitting plate includes a light-transmitting portion and a light-reflecting portion, the light-transmitting portion is adjacent to the sidewall of the light-transmitting plate. An opaque layer is arranged on a back surface of the light-reflecting portion, allowing a front surface of the light-reflecting portion to be served as a mirror surface. The frame includes a mounting part, which is arranged on the sidewall of the light-transmitting plate. The light source module is configured to provide a light source, arranged between the sidewall of the light-transmitting plate and the mounting portion. The light source module emits light to the sidewall of the light-transmitting plate, allowing the light to illuminate the light-transmitting portion.

20 Claims, 8 Drawing Sheets

LIGHT-EMITTING MIRROR AND FLUORESCENT MESSAGE MIRROR

CROSS REFERENCE TO RELATED APPLICATIONS

This application claims priority benefits to Chinese Patent Application No. 2024200468025, filed on Jan. 8, 2024, the contents of which are incorporated herein by reference in its entirety.

TECHNICAL FIELD

The present disclosure relates to the technical field of daily necessities, and in particular, to a light-emitting mirror and a fluorescent message mirror.

BACKGROUND

A light-emitting mirror typically refers to a mirror with an auxiliary light source, assisting people in applying makeup or grooming by illuminating their faces. However, existing light-emitting mirrors sometimes have the light source directly arranged on the mirror's surface, causing light to shine directly into the eyes and resulting in significant discomfort. In other cases, the light source may be placed behind the mirror, where it undergoes multiple reflections before emerging. This setup can lead to severe light attenuation, resulting in high energy consumption or insufficient brightness on the face.

SUMMARY

The embodiments of the present disclosure provide a light-emitting mirror, including: a light-transmitting plate, including a front side, a back side, and a sidewall, the front side opposite to the back side, the sidewall connecting the front side and the back side, the light-transmitting plate including a light-transmitting portion and a light-reflecting portion, the light-transmitting portion adjacent to the sidewall and configured to transmit light, and a back surface of the light-reflecting portion arranged with an opaque layer to allow a front surface of the light-reflecting portion to serve as a mirror surface; a frame, including a mounting part arranged on the sidewall of the light-transmitting plate; and a light source module, configured to provide a light source, arranged between the sidewall of the light-transmitting plate and the mounting part, the light source module configured to emit a light beam onto the sidewall of the light-transmitting plate to allow the light beam to enter the light-transmitting plate and illuminate the light-transmitting portion.

The present disclosure also provides a fluorescent message mirror, including: a light-transmitting panel, including a front side, a back side, and a sidewall, the front side opposite to the back side, and the sidewall connecting the front side and the back side, the front side serving as a fluorescent marker writing area of the fluorescent message mirror; a frame, including a mounting part arranged on the sidewall of the light-transmitting panel; and a light source module, arranged between the mounting part and the sidewall of the light-transmitting panel, configured to emit a light beam onto the sidewall of the light-transmitting panel to allow the light beam to enter the light-transmitting panel and display a fluorescent marker writing on the front side of the light-transmitting panel.

BRIEF DESCRIPTION OF THE DRAWINGS

To clarify the technical solutions of the present disclosure, a brief introduction to the drawings used in the description is provided below. It is apparent that the drawings described below are merely some embodiments of the present disclosure. Those skilled in the art can derive other drawings from these without creative effort.

DETAILED DESCRIPTION OF THE EMBODIMENTS

To make the objectives, features, and advantages of the present disclosure clearer and more understandable, the following provides a detailed description with reference to the accompanying drawings and embodiments. It is evident that the described embodiments are part of the present disclosure but not all of them. Based on the embodiments of the present disclosure, all other embodiments obtained by those skilled in the art without creative efforts fall within the protection scope of the present disclosure.

Through analysis of the prior art, the inventors discovered that current light-emitting mirrors often have light sources placed directly on the mirror surface, causing intense light to shine directly into the user's eyes and leading to discomfort. Others have the light sources positioned behind the mirrors, where the light undergoes multiple reflections before emerging, leading to significant light attenuation. This results in high energy consumption or insufficient brightness of the light on the user's face.

Figure 1:
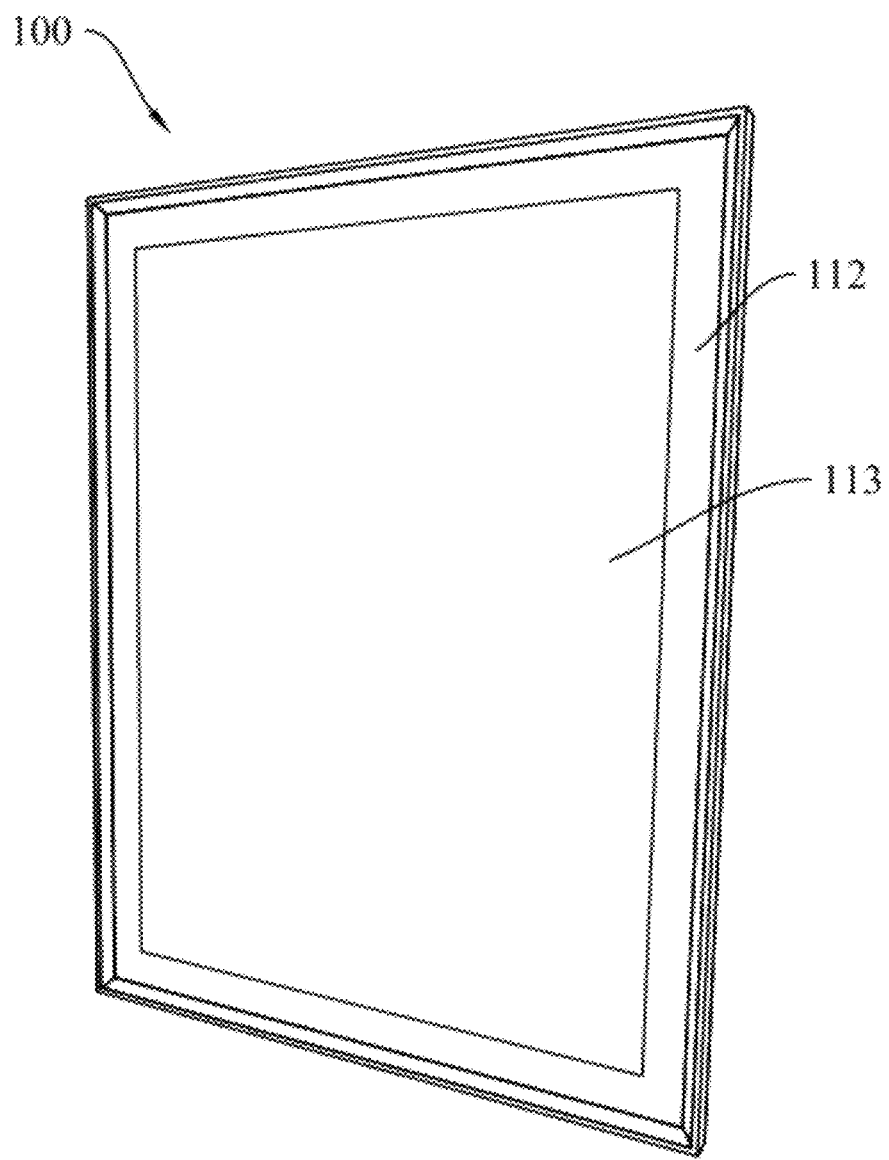
FIG. 1 is a schematic structural view of a light-emitting mirror according to an embodiment of the present disclosure.
Figure 2:
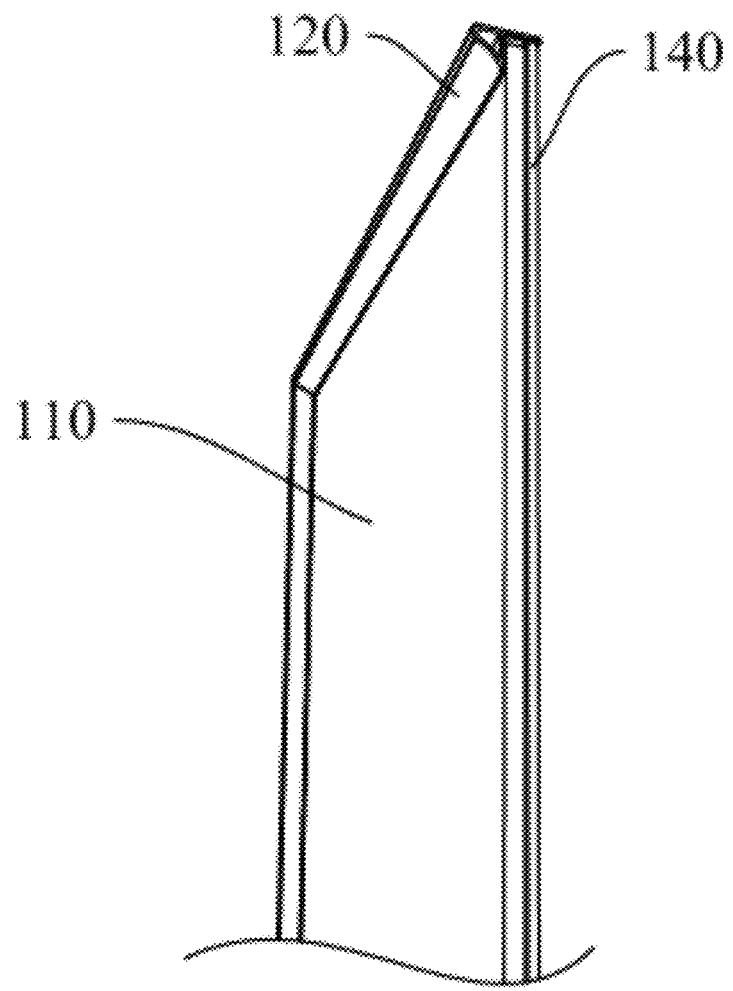
FIG. 2 is a schematic structural view of a light-emitting mirror according to an embodiment of the present disclosure.
Figure 3:
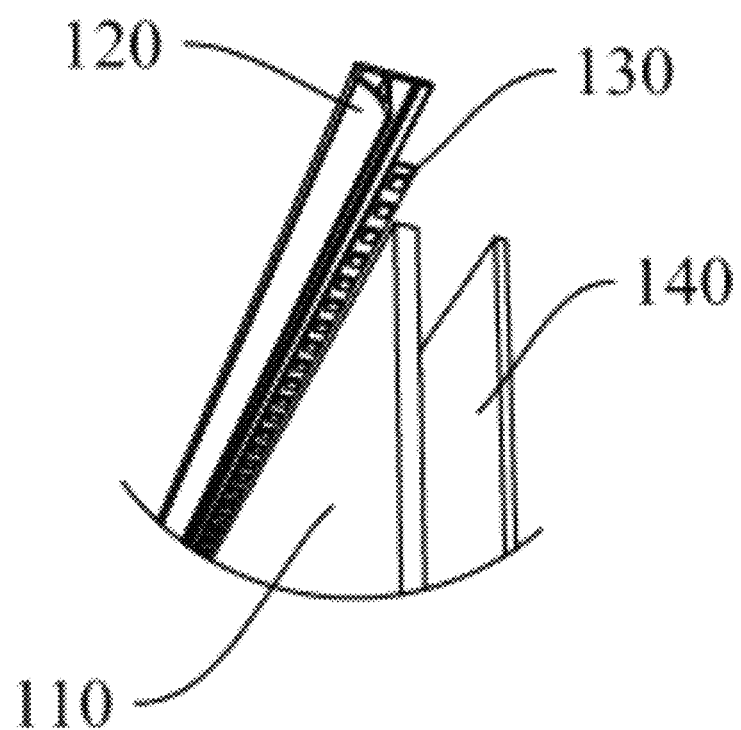
FIG. 3 is an exploded view of a light-emitting mirror according to an embodiment of the present disclosure.

To address the issue of intense light directly shining into the eyes and causing discomfort, the present disclosure proposes a light-emitting mirror 100. As shown in FIG. 1 to FIG. 3, the light-emitting mirror 100 includes a light-transmitting plate 110, a frame 120, and a light source module 130.

The light-transmitting plate 110 includes a front side, a back side, and a sidewall. The front side and the back side of the light-transmitting plate 110 are arranged opposite to each other, and the sidewall of the light-transmitting plate 110 connect the front side and the back side of the light-transmitting plate 110. The light-transmitting plate 110 includes a light-transmitting portion 112 and a light-reflecting portion 113. The light-transmitting portion 112 is adjacent to the sidewall of the light-transmitting plate 110 and is configured for transmitting light. A back surface of the light-reflecting portion 113 has an opaque layer to allow a front surface of the light-reflecting portion 113 to serve as a mirror.

The frame 120 includes a mounting part 124 arranged on the sidewall of the light-transmitting plate 110.

The light source module 130, configured to provide light, is placed between the sidewall of the light-transmitting plate 110 and the mounting part 124. The light source module 130 is close to the light-transmitting portion 112. The light source module 130 emits light onto the sidewall of the light-transmitting plate 110, making the light enter the light-transmitting plate 110 and forms illumination at the light-transmitting portion 112.

In the technical solution of the present disclosure, the light source module 130 is arranged on the sidewall of the light-transmitting plate 110, and the light is emitted from the sidewall of the light-transmitting plate 110 into the light-reflecting portion 113 of the light-transmitting plate 110, thereby softening the light and solving the problem of light source directly shining into the human eye and causing eye discomfort.

In the present embodiment, the light-transmitting plate 110 can be made of transparent glass and its shape can be rectangular, circular, or oval. The specific shape of the light-transmitting plate 110 is not limited here. The opaque layer on the back surface of the light-reflecting portion 113 can be a silver coating or a reflective ink layer, aiming to create a mirror effect on the front side.

As illustrated in FIG. 1 to FIG. 3, in the embodiment of the present disclosure, the frame 120 can be configured to install the light source module 130. On the other hand, the frame 120 can also be configured to decorate and protect the light-transmitting plate 110.

In the embodiment of the present disclosure, the light source module 130 is an LED strip light, or the light source module 130 is composed of multiple single light sources.

In some embodiments, the frame 120 is arranged on the sidewall of the light-transmitting plate 110 and is covered around the sidewall of the light-transmitting plate 110.

In some embodiments, the shape of the frame 120 can be rectangular, circular, or elliptical, and the specific shape of the frame 120 is not limited here.

In some embodiments, to improve the brightness of the light, the light-transmitting portion 112 is arranged adjacent to a side arm of the light-transmitting plate 110 and is contained around the sidewall of the light-transmitting plate 110.

As illustrated in FIG. 3, in a preferred embodiment of the present disclosure, to reduce light decay and increase light output efficiency of the front side, the light-emitting mirror 100 further includes an optical reflector 140. The optical reflector 140 is arranged on a back surface of the light-transmitting portion 112 for reflecting light.

In some embodiments, the optical reflector 140 is an optical reflector plate.

It is understood that one side of the optical reflector plate which faces the light-transmitting plate 110 has the effect of reflecting light.

Figure 4:
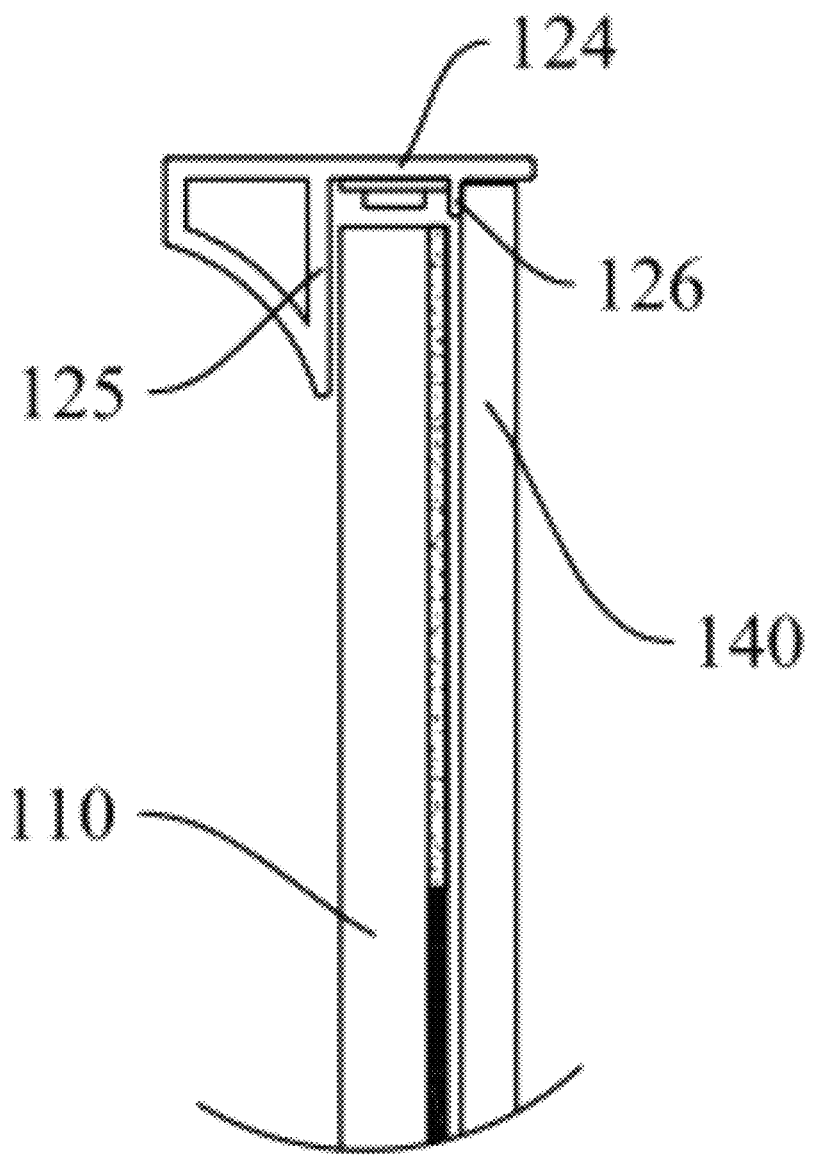
FIG. 4 is a cross-sectional view of a light-emitting mirror according to an embodiment of the present disclosure.

As illustrated in FIG. 4, further, to make the light received by the human eye softer, the back surface of the light-transmitting portion 112 is designed as a frosted surface. In some embodiments, the back surface of the light-transmitting portion 112 can be processed by sandblasting or laser engraving.

Figure 5:
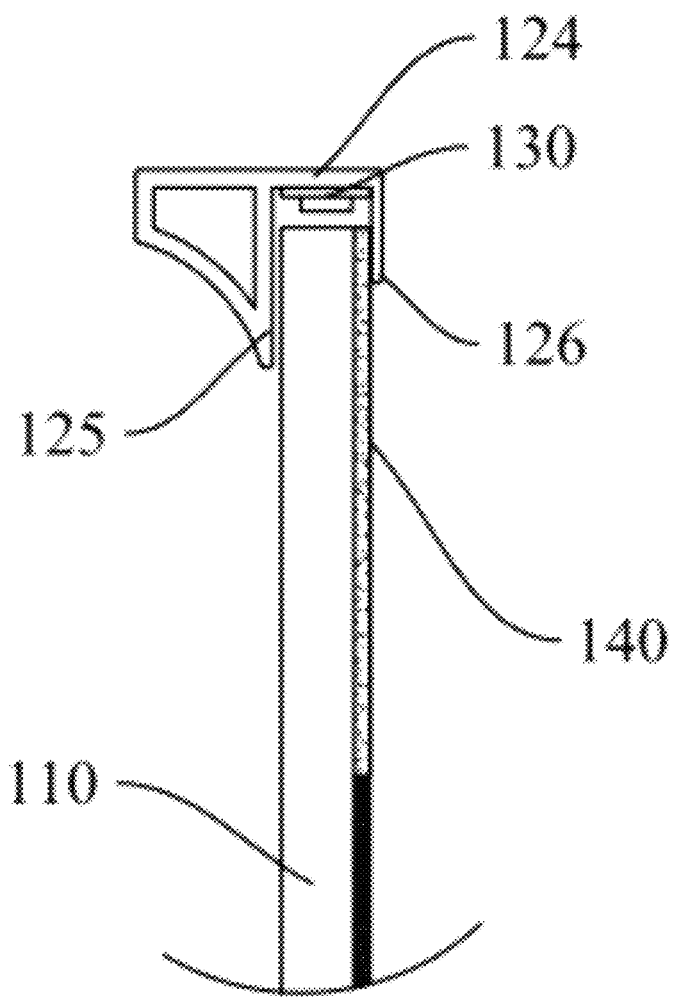
FIG. 5 is a cross-sectional view of a light-emitting mirror according to another embodiment of the present disclosure.

As illustrated in FIG. 5, in another embodiment of the present disclosure, the optical reflector 140 is an optical reflective ink layer.

It is understood that the use of the optical reflective ink instead of the optical reflector plate can reduce the production cost of the light-emitting mirror 100, and on the other hand, it also reduces the thickness and mass of the light-emitting mirror 100.

In some embodiments, the optical reflective ink layer can be arranged by printing or coating.

As illustrated in FIG. 5, in another embodiment of the present disclosure, the light source module 130 is fixedly installed on a mounting part 124 of the frame 120. It is understandable that the material of the light-transmitting plate 110 is usually fragile glass. The installation of the light source on the glass increases the difficulty of installation. By fixing the light source module 130 onto the mirror frame 120, it becomes easier for workers to operate and install. In addition, fixing the light source module 130 onto the mirror frame 120 also helps prevent contamination of the sidewall of the light-transmitting plate 110, thereby preserving its light-transmitting effectiveness.

As illustrated in FIG. 4 or FIG. 5, in a more specific embodiment, the frame 120 also includes a first light-blocking part connected to the mounting part 124. The first light-blocking part is arranged on the front side of the light-transmitting plate 110 for blocking light. It is understandable that the arrangement of the first light-blocking part avoids light leakage, and the light emitted by the light source module 130 directly entering the human eye and improves the energy efficiency of light entering the sidewall of the light-transmitting plate 110.

As illustrated in FIG. 4 or FIG. 5, further, the frame 120 also includes a second light-blocking part 126 arranged opposite to the first light-blocking part, and the second light-blocking part 126 is connected to the mounting part 124.

As illustrated in FIG. 4, the second light-blocking part 126 is configured to install the optical reflector, and the second light-blocking part 126 and the optical reflector jointly block the light incident on the back side of the light-transmitting plate 110 to avoid light leakage and unnecessary light decay.

As illustrated in FIG. 5, the second light-blocking part 126 is configured to fix the light-transmitting plate 110, and the second light-blocking part 126 can also be configured to block the light incident on the back side of the light-transmitting plate 110 to avoid light leakage.

Figure 6:
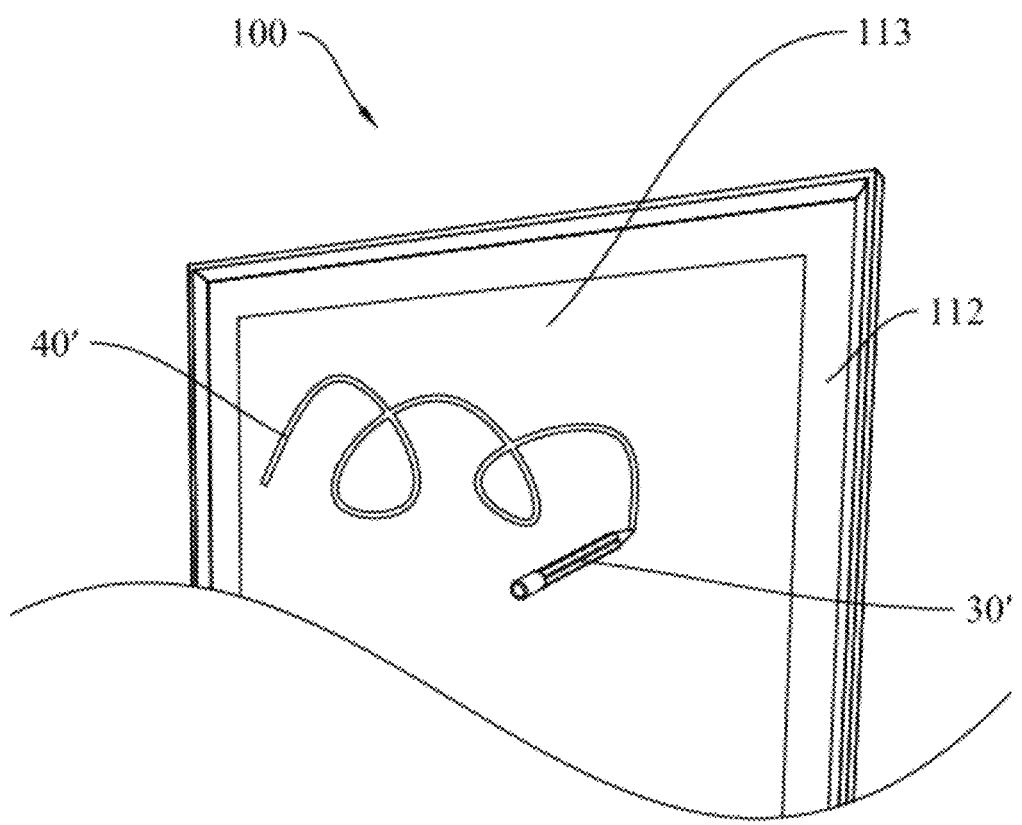
FIG. 6 is a reference view showing the usage state of a light-emitting mirror according to an embodiment of the present disclosure.

As illustrated in FIG. 6, in one embodiment of the present disclosure, a front surface of the light-reflecting portion 113 is a writing area of the fluorescent marker 30'. Alternatively, the front surfaces of the light-reflecting portion 113 and the light-transmitting portion 112 are the writing area of the fluorescent marker 30'.

The light can be incident from the sidewall of the light-transmitting plate 110 into an inside of the light-transmitting portion 112 and an inside of the light-reflecting portion 113 in sequence. When the user uses the fluorescent marker 30' to write in the writing area, the writing can be clearly displayed under the illumination of the light source module 130, enabling the reflector to be served as a fluorescent message mirror/board 200.

Figure 7:
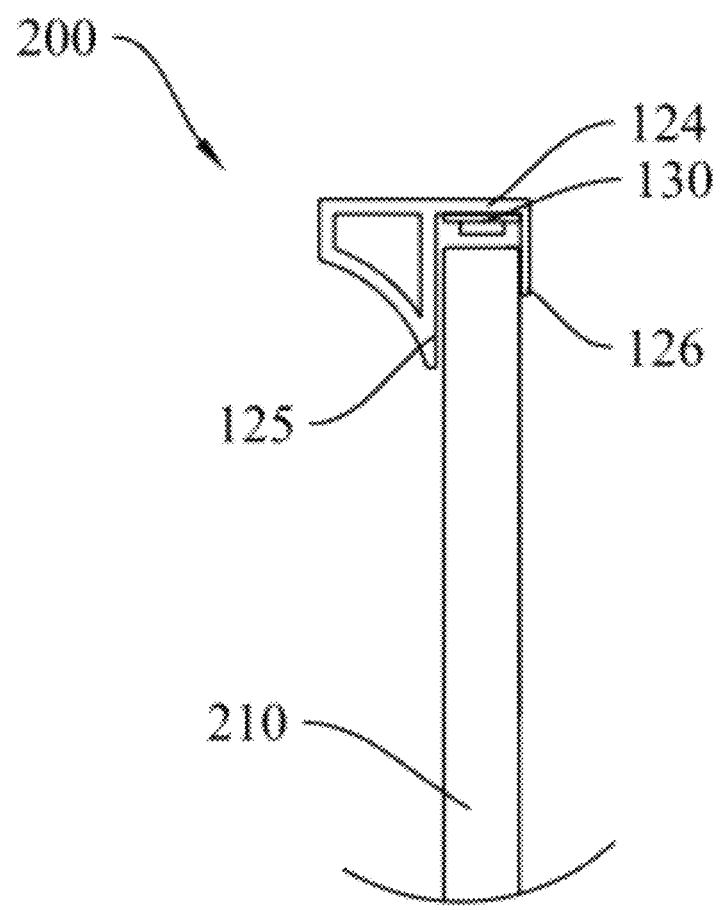
FIG. 7 is a cross-sectional view of a fluorescent message mirror according to an embodiment of the present disclosure.
Figure 8:
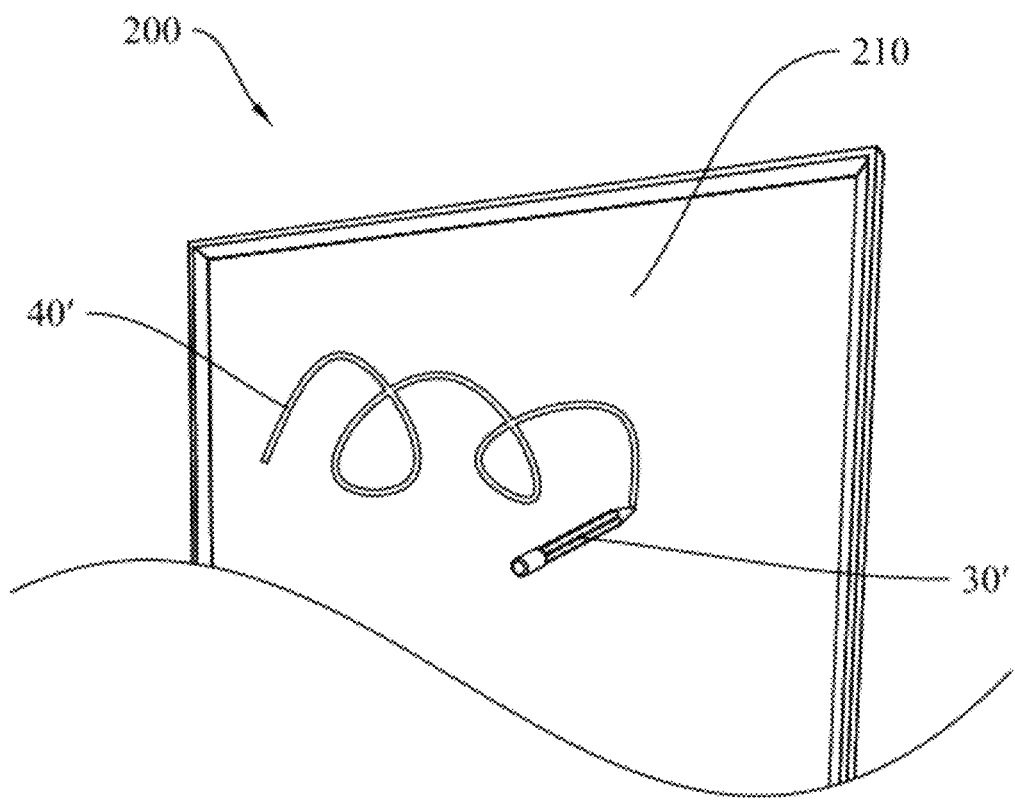
FIG. 8 is a reference view showing the usage state of a fluorescent message mirror according to an embodiment of the present disclosure.

As illustrated in FIG. 7 and FIG. 8, in the context of the above embodiments, the present disclosure also proposes a fluorescent message mirror 200, which includes a light-transmitting panel 210, a frame 120, and a light source module 130.

The light-transmitting panel 210 has a front side, a back side and a sidewall. The front side of the light-transmitting panel 210 is arranged opposite to the back side of the light-transmitting panel 210, and the sidewall of the light-transmitting panel 210 connects the front side and the back side of the light-transmitting panel 210. The front side of the light-transmitting panel 210 is a writing area of the fluorescent marker 30'.

The frame 120 includes a mounting part 124, and the mounting part 124 is arranged on the sidewall of the light-transmitting panel 210.

The light source module 130 is arranged between the mounting part 124 and the sidewall of the light-transmitting panel 210. The light source module 130 is configured to provide a light source and emit light onto the sidewall of the light-transmitting panel 210, allowing the light to enter the light-transmitting panel 210, and displaying the handwriting 40' of the fluorescent marker 30' on the front side of the light-transmitting panel 210.

In some embodiments, to improve the display effect of the handwriting, the frame 120 is arranged around the sidewall of the light-transmitting panel 210. Similarly, the light source module 130 is also arranged around the sidewall of the light-transmitting panel 210.

The present disclosure has the following advantages.

To address the issue in the prior art where a light source directly placed on the outer surface of the mirror body causes light to directly enter the human eye, resulting in strong discomfort, the embodiments of the present disclosure provide a light-emitting mirror that avoids direct light exposure to the human eye. Specifically, the light-emitting mirror includes: a light-transmitting plate, including a front side, a back side, and a sidewall, the front side opposite to the back side, the sidewall connecting the front side and the back side, the light-transmitting plate including a light-transmitting portion and a light-reflecting portion, the light-transmitting portion adjacent to the sidewall and configured to transmit light, and a back surface of the light-reflecting portion arranged with an opaque layer to allow a front surface of the light-reflecting portion to serve as a mirror surface; a frame, including a mounting part arranged on the sidewall of the light-transmitting plate; and a light source module, configured to provide a light source, arranged between the sidewall of the light-transmitting plate and the mounting part, the light source module configured to emit a light beam onto the sidewall of the light-transmitting plate to allow the light beam to enter the light-transmitting plate and illuminate the light-transmitting portion. The present disclosure addresses the issue of direct light entering the human eye and causing discomfort by positioning the light source module on the sidewall of the light-transmitting plate. The light enters through the sidewall and reaches the reflective portion, thereby softening the light.

Although some embodiments of the present disclosure have been described, those skilled in the art may make additional changes and modifications to these embodiments once they know the basic creative concept. Therefore, the attached claims are intended to be interpreted as including the embodiments and all changes and modifications that fall within the scope of the embodiments of the present disclosure.

Finally, it should be noted that in this context, relational terms such as first and second, etc. are only used to distinguish one entity or operation from another entity or operation, and do not necessarily require or imply any such actual relationship or order between these entities or operations. Moreover, the terms "include", "including" or any other variants thereof are intended to cover non-exclusive inclusion, so that a process, method, product or terminal device including a series of elements includes not only those elements, but also other elements not explicitly listed, or also includes elements inherent to such process, method, product or terminal device. In the absence of further restrictions, the elements defined by the sentence "includes one . . . " do not exclude the existence of other identical elements in the process, method, product or terminal device including the elements.

The above is a detailed introduction to a light-emitting mirror and device provided by the present disclosure. Specific examples are used in this context to illustrate the principles and implementation methods of the present disclosure. The description of the above embodiments is only used to help understand the method of the present disclosure and its core idea. For those skilled in the art, according to the idea of the present disclosure, there will be changes in the specific implementation method and application scope. In summary, the content of this specification should not be understood as a limitation on the present disclosure.

What is claimed is:

1. A light-emitting mirror, comprising:
  a light-transmitting plate, comprising a front side, a back side, and a sidewall, wherein the front side is opposite to the back side, the sidewall connects the front side and the back side, the light-transmitting plate comprises a light-transmitting portion and a light-reflecting portion, the light-transmitting portion is adjacent to the sidewall and configured to transmit light, and a back surface of the light-reflecting portion is arranged with an opaque layer to allow a front surface of the light-reflecting portion to serve as a mirror surface;
  a frame, comprising a mounting part arranged on the sidewall of the light-transmitting plate; and
  a light source module, configured to provide a light source, arranged between the sidewall of the light-transmitting plate and the mounting part, wherein the light source module is configured to emit a light beam onto the sidewall of the light-transmitting plate to allow the light beam to enter the light-transmitting plate and illuminate the light-transmitting portion.

2. The light-emitting mirror of claim 1, further comprising an optical reflector, wherein the optical reflector is arranged on a back surface of the light-transmitting portion and configured to reflect light.

3. The light-emitting mirror of claim 2, wherein the back surface of the light-transmitting portion is frosted.

4. The light-emitting mirror of claim 2, wherein the optical reflector is arranged on the back surfaces of the light-transmitting portion and the light-reflecting portion.

5. The light-emitting mirror of claim 2, wherein the optical reflector is an optical reflective ink layer.

6. The light-emitting mirror of claim 1, wherein the light source module is fixedly mounted on the mounting part.

7. The light-emitting mirror of claim 1, wherein the frame further comprises a first light-blocking part connected to the mounting part, and the first light-blocking part is arranged on the front side of the light-transmitting plate to block light.

8. The light-emitting mirror of claim 2, wherein the frame further comprises a first light-blocking part connected to the mounting part, and the first light-blocking part is arranged on the front side of the light-transmitting plate to block light.

9. The light-emitting mirror of claim 3, wherein the frame further comprises a first light-blocking part connected to the mounting part, and the first light-blocking part is arranged on the front side of the light-transmitting plate to block light.

10. The light-emitting mirror of claim 4, wherein the frame further comprises a first light-blocking part connected to the mounting part, and the first light-blocking part is arranged on the front side of the light-transmitting plate to block light.

11. The light-emitting mirror of claim 5, wherein the frame further comprises a first light-blocking part connected to the mounting part, and the first light-blocking part is arranged on the front side of the light-transmitting plate to block light.

12. The light-emitting mirror of claim 6, wherein the frame further comprises a first light-blocking part connected to the mounting part, and the first light-blocking part is arranged on the front side of the light-transmitting plate to block light.

13. The light-emitting mirror of claim 7, wherein the frame further comprises a second light-blocking part opposite to the first light-blocking part, and the second light-blocking part is connected to the mounting part.

14. The light-emitting mirror of claim 1, wherein the front surface of the light-reflecting portion forms a fluorescent marker writing area; or the front surfaces of the light-reflecting portion and the light-transmitting portion form the fluorescent marker writing area.

15. The light-emitting mirror of claim 2, wherein the front surface of the light-reflecting portion forms a fluorescent marker writing area; or the front surfaces of the light-reflecting portion and the light-transmitting portion form the fluorescent marker writing area.

16. The light-emitting mirror of claim 3, wherein the front surface of the light-reflecting portion forms a fluorescent marker writing area; or the front surfaces of the light-reflecting portion and the light-transmitting portion form the fluorescent marker writing area.

17. The light-emitting mirror of claim 4, wherein the front surface of the light-reflecting portion forms a fluorescent marker writing area; or the front surfaces of the light-reflecting portion and the light-transmitting portion form the fluorescent marker writing area.

18. The light-emitting mirror of claim 5, wherein the front surface of the light-reflecting portion forms a fluorescent marker writing area; or the front surfaces of the light-reflecting portion and the light-transmitting portion form the fluorescent marker writing area.

19. The light-emitting mirror of claim 6, wherein the front surface of the light-reflecting portion forms a fluorescent marker writing area; or the front surfaces of the light-reflecting portion and the light-transmitting portion form the fluorescent marker writing area.

20. A fluorescent message mirror, comprising:
- a light-transmitting panel, comprising a front side, a back side, and a sidewall, wherein the front side is opposite to the back side, and the sidewall connects the front side and the back side, the front side serves as a fluorescent marker writing area of the fluorescent message mirror;
- a frame, comprising a mounting part arranged on the sidewall of the light-transmitting panel; and
- a light source module, arranged between the mounting part and the sidewall of the light-transmitting panel, configured to emit a light beam onto the sidewall of the light-transmitting panel to allow the light beam to enter the light-transmitting panel and display a fluorescent marker writing on the front side of the light-transmitting panel.

* * * * *